United States Patent
Gary

[15] 3,676,487
[45] July 11, 1972

[54] ISOMERIZATION OF 2-HYDROXY P-METHANE 1-CARBOXYLATE AND 2-HYDROXY-8-P-MENTHENE-1-CARBOXYLATE TO THE CORRESPONDING 1-HYDROXY-2-CARBOXYLATE COUNTERPART

[72] Inventor: Wilbur Gary, Jacksonville, Fla.

[73] Assignee: SCM Corporation, Cleveland, Ohio

[22] Filed: May 20, 1971

[21] Appl. No.: 145,496

[52] U.S. Cl. ..................260/489, 260/631 H, 260/631 R
[51] Int. Cl. .................................................C07c 67/00
[58] Field of Search................................................260/489

[56] References Cited

UNITED STATES PATENTS

| | | | |
|---|---|---|---|
| 2,818,427 | 12/1957 | Bain et al. | 260/489 |
| 2,866,826 | 12/1958 | McLaughlin et al. | 260/489 |
| 3,014,047 | 12/1961 | Bain et al. | 260/489 |

*Primary Examiner*—Vivian Garner
*Attorney*—Merton H. Douthitt, Harold M. Baum, Howard G. Bruss, Russell L. Brewer and James E. Carson

[57] ABSTRACT

The isomerization of 2-hydroxy-1-carboxylates of 8-p-menthene and p-menthane to the 1-hydroxy-2-carboxylates is accomplished by heating the reactants to a temperature of between about 30° C. to 180° C. for a time sufficient to effect substantial isomerization.

7 Claims, No Drawings

ISOMERIZATION OF 2-HYDROXY P-METHANE 1-CARBOXYLATE AND 2-HYDROXY-8-P-MENTHENE-1-CARBOXYLATE TO THE CORRESPONDING 1-HYDROXY-2-CARBOXYLATE COUNTERPART

Monocyclic terpene hydrocarbons having a single double bond in the ring located at the "1" position have been oxidized to form the 1,2-epoxides. Limonene and 1-p-menthene, for example, have been oxidized with air, oxygen, or oxygen donating compounds, e.g., perbenzoic acid to form these epoxides.

It is known that limonene-1,2-oxides when reacted with glacial acetic acid at room temperature (70° F.) produces hydroxyacetate isomers. This reaction is shown in the article entitled "Reactions of the Limonene 1,2-oxides", by Royals and Leffingwell, Journal of Organic Chemistry, Vol. 31, 1937-1944, June, 1966, and such article is incorporated by reference.

It is known that the cis isomer of limonene 1,2-oxide (8-p-menthadiene-1,2-oxide) on reaction with glacial acetic acid predominantly produces the 2-hydroxy-8-p-menthene-1-acetate isomer, whereas the trans isomer of limonene 1,2-oxide predominantly pro-duces upon reaction with the glacial acetic acid the 1-hydroxy-8-p-menthene-2-acetate isomer. It is also known that isolimonene-1-ol (trans-2,8-p-menthadiene-1-ol) is produced by pyrolyzing the 1-hydroxy-p-8-menthene-2-acetate isomer whereas isomeric carveols are produced on pyrolysis of the 2-hydroxy-p-8-menthene-1-acetate isomer. Isolimonene-1-ol is highly useful as intermediate in the synthesis of menthol isomers, particularly 1-menthol and in the synthesis of tetrahydrocannabinol. It can also be hydrogenated to B-terpineol. On the other hand, the isomeric carveols obtained on reaction from the cis isomer of 8-p-menthene-1,2-oxide cannot be converted to the desirable menthol isomers, tetrahydrocannabinol or β-terpineol. A route for synthesizing menthol isomers from trans isolimonene-1-ol is shown in U. S. Pat. No. 3,014,047 and No. 3,028,418 and are hereby incorporated by reference.

One of the advantages of this invention is that the cis isomer of limonene-1,2-oxide and p-menthene-1,2-oxide when reacted with a carboxylic acid to form corresponding 2-hydroxy-1-carboxylate isomers can further be isomerized to form the 1-hydroxy-2-carboxylate isomers.

Prior to the invention, the cis isomer of limonene and p-menthene-1,2-oxides was not used in the synthesis of menthol intermediates. Thus, the cis isomers had to be separated from the trans isomers or their reaction products were later separated from the desired menthol intermediate reaction products.

It has been found that reactants and mixtures thereof selected from the group consisting of 2-hydroxy-p-menthane-1-carboxylate and 2-hydroxy-8-p-menthene-1-carboxylate predominantly formed upon reacting the cis isomer of the 1,2-oxide of p-menthane or 8-p-menthene with a lower carboxylic acid having from one to six carbon atoms in the structure can be isomerized to the 1-hydroxy-2-carboxylate isomer in substantial yield. Isomerization is carried out at a temperature sufficient for effecting substantial isomerization (at least 40 percent by weight of the 2-hydroxy isomer) but insufficient for effecting substantial pyrolysis of the reactant and isomerized product and for a time sufficient to effect such substantial isomerization.

As taught by Royals and Leffingwell, there are several hydroxy-acetate isomers formed when 1,2-oxides of limonene or p-1-menthene are reacted with glacial acetic acid. The hydroxyacetate isomers which are isomerized according to the process of this invention are meant to include those hydroxyacetates of the trans glycols.

Structural formulas for such compounds are as follows:

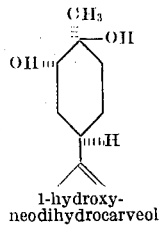
1-hydroxy-neodihydrocarveol

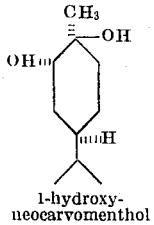
1-hydroxy-neocarvomenthol i.e., 1-hydroxy-neodihydrocarveol and 1-hydroxy-neocarvomenthol. Two remaining isomers present in only a small amount by the reaction of the oxides with glacial acetic acid are those hydroxyacetates of the cis glycols. These isomers include: 1-hydroxy-neo-isodihydrocarveol and 1-hydroxy-neo-isocarvomenthol.

The 2-hydroxy, 1-acetate isomers derived from cis glycols are readily distinguishable and separable from the 1-hydroxy 2-acetate isomers derived from the respective trans glycols. These isomers can be separated from each other by fractionation; e.g., distillation and structure of the compounds is confirmed by NMR (nuclear magnetic resonance) analysis.

For purposes of the invention, p-1, 8-menthadiene, often referred to as limonene and p-1-menthene, can be used, p-1-menthene differing from limonene in that it does not have the terminal un-saturation between the 8 and 9 carbon atom.

p-1-Menthene is represented by the formula below:

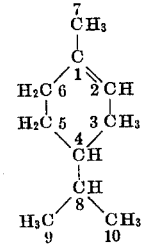

p-1,8-menthadiene or limonene is represented by the formula below:

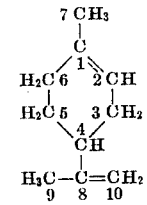

The carboxylate groups pendant from the monocyclic terpene hydrocarbons shown above are formed by reacting the terpene 1,2-oxides with a carboxylic acid having from one to six carbon atoms. Preferably, the carboxylic acids are saturated monocarboxylic fatty acids and include: formic, acetic, propionic, and butyric.

For convenience, 2-hydroxy-p-menthane-1-acetate will be used in discussing the isomerization reaction and further conversion to the menthol isomers.

Isomerization of 2-hydroxy-p-menthane-1-acetate to 1-hydroxy-p-menthane-2-acetate is carried out at a temperature (at least 40° C.) sufficient for effecting substantial isomerization (of at least about 40 percent by weight of the 2-hydroxy isomer) of the 2-hydroxy-p-menthene-1-acetate but insufficient for effecting pyrolysis of the 2-hydroxy-p-menthane-1-acetate or the end product; i.e., 1-hydroxy-p-menthane-2-acetate. Generally isomerization is carried out at a temperature of between about 40°-180° C. and preferably, between about 80°-180° C. When temperatures higher than 180° are employed, pyrolysis of the reactant or product often results, thus resulting in decreased conversion and yield. Temperatures below about 80° C. often result in extremely long isomerization times; e.g., 50–100 hrs. for accomplishing isomerization in substantial yield. When the corresponding formate esters are employed in place of the acetate esters, lower reaction temperatures (e.g., often below 40° C.) can be employed. For reasons of efficiency and economy, it is preferred to carry out isomerization of acetate and higher homolog carboxylic acid esters at a temperature between about 125°-150° C. over a period of from about 12–24 hours.

It has been found that isomerization of the 2-hydroxy-p-menthane-1-acetate isomer to the 1-hydroxy-p-menthane-2-acetate isomer can be catalyzed by incorporating a weak organic acid or a stable salt thereof; e.g., an alkali metal salt of such weak acid or mixtures thereof in the reaction medium.

Strong acids; e.g., the mineral acids such as sulfuric and hydrochloric even at dilute concentrations often cause the formation of undesirable byproducts including, for example, p-menthadiene isomers.

Weak organic acids that can be used for catalyzing the isomerization preferably are the lower alkanoic acids having from about one to six carbon atoms and include: formic, acetic, propionic, and butyric. For reasons of efficiency and economy, acetic acid is the preferred acid for catalyzing the isomerization reaction. The acid is typically incorporated in the reaction medium in an amount of from about 2–100 percent, preferably 5–40 percent and more preferably, about 5–20 percent by weight of the reactant to be isomerized. Although concentrations of acid higher than 100 percent can be used, the increased concentrations are not used for reasons of efficiency and economy.

Weak acid stable salts of strong bases, which are soluble in the reaction medium, can also be incorporated in the reaction medium for their synergistic action in combination with the weak organic acid for catalyzing the reaction. It is preferred that the salts be used in an amount not substantially in excess of 20 percent by weight of the acid employed. Although higher concentrations of salt can be used, the yield and conversion of the reactant to the isomerized product often is not substantially increased. Thus, for reasons of efficiency and economy, such concentrations are not used.

Weak acid salts of strong bases which are soluble in the reaction medium preferably include the alkali metal salts; e.g., sodium acetate, potassium acetate, sodium propionate, etc. and the corresponding ammonium salts; e.g., ammonium acetate.

The isomerization reaction can be conducted at pressures from subatmospheric to several hundred pounds per square inch with isomerization times and temperatures controlled accordingly. Higher pressures can be used when higher temperatures are used. Under such conditions, if higher pressures are not used, the acid has a tendency to boil away at high temperatures. For reasons of efficiency and economy, atmospheric pressure is generally used in carrying out isomerization reaction and the acid and temperatures selected accordingly.

The products employed in this invention are not highly corrosive. Therefore, conventional materials of construction which are resistant to the acid employed can be used for lining a reaction vessel. Glass-lined vessels are preferred.

Although not intending to be bound by theory, it is believed a synthesis route from the trans isomer of p-menthane-1, 2-oxide to 1-menthol is shown by the following formulas in Reaction 1:

REACTION 1

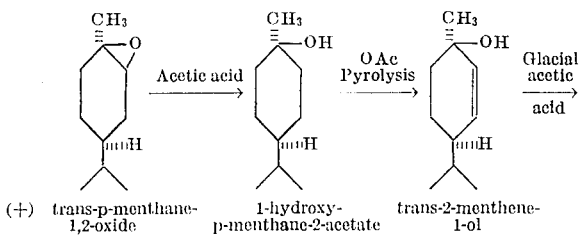

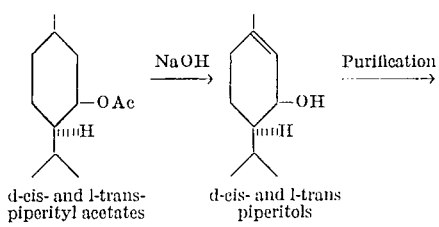

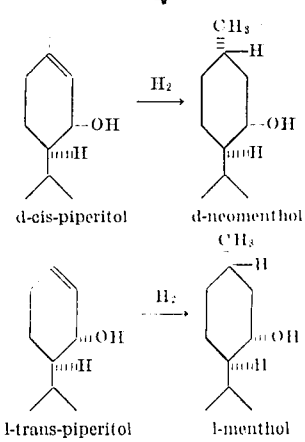

Reaction 2 illustrates the formation of the 2-hydroxy-1-acetate isomer from cis-p-menthane-1,2-oxide followed by pyrolysis to the corresponding products. Carvotanacetol is the major pro-duct produced.

REACTION 2

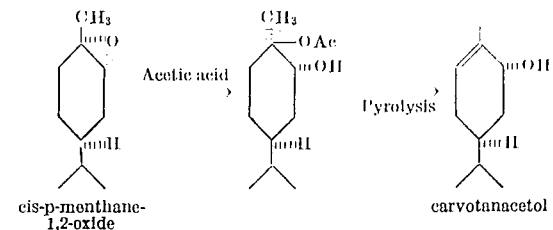

Thus, in the series of reactions set forth above, the importance of being able to form the 1-hydroxy-p-menthane-2-acetate isomer as opposed to the 2-hydroxy-1-acetate isomer is shown. An undesirable and entirely different product is obtained on using the 2-hydroxy isomer.

The following examples are provided to illustrate the preferred embodiment of this invention and are not intended to restrict the scope thereof. All parts are parts by weight, all percentages are expressed as weight percentages, and all temperatures are in degrees Centigrade, unless otherwise specified.

EXAMPLE 1

One hundred parts of an equal proportion of cis and trans p-menthane-1,2-epoxide is charged to a glass-lined vessel equipped with an agitator. One hundred parts of glacial acetic acid and 10 parts sodium acetate are charged to the vessel and stirred at 90° C. for 6 hours. The reacted solution, then, is cooled to ambient temperature and neutralized with aqueous sodium bicarbonate solution. The resultant contents are diluted with 100 parts of benzene and the resulting oil and water phases separated. The aqueous phase is extracted with 25 parts of benzene and the extract added to the previous oil phase. The benzene then is stripped off with reduced pressure while heating with a boiling water bath. The product on analysis contains 53 percent 1-hydroxy-p-menthane-2-acetate and 38 percent 2-hydroxy-p-menthane-1-acetate, the balance being unidentified isomers and byproduct. Substantially simultaneous preparation of the hydroxy-acetate isomers and isomerization of the 2-hydroxy-1-acetate isomer is noted.

EXAMPLE 2

One hundred parts trans-menthane-1,2-epoxide when reacted in a manner identical to that of the epoxide in Example 1 produced upon recovery a product containing 80 percent by weight of 1-hydroxy-p-menthane-2-acetate, the balance being unidentified isomers and by-product.

EXAMPLE 3

One hundred parts cis-menthane-1,2-epoxide when reacted in a manner identical to that of the p-menthane oxide of Example 1 produced on recovery a product containing 75 percent by weight of the 2-hydroxy-p-menthane-1-acetate, the balance being unidentified isomers and by-product.

EXAMPLE 4

Isomerization of 2-hydroxy-p-menthane-1-acetate to 1-Hydroxy-p-menthane-2-acetate One hundred parts of the product obtained in Example 34containing 75 percent by weight 2-hydroxy-p-menthane-1-acetate is charged to a vessel. Fifty parts of glacial acetic acid and 5 parts sodium acetate are added to the vessel and the resultant contents heated to a temperature of 135° for 24 hours for isomerization. Atmospheric pressure is maintained during the isomerization reaction. A product containing 68 percent 1-hydroxy-p-menthane-2-acetate and 6 percent 2-hydroxy-p-menthane-1-acetate is recovered, the balance being unidentified isomers and by-product.

EXAMPLE 5

Preparation of 1-hydroxy-p-menthane-2-acetate from Cis-p-menthane-1,2-oxide 16 7/10 grams of p-menthane-1,2-oxide (90 percent cis, 10 percent trans), 10.6 g. acetic acid and 1.0 g. anhydrous sodium acetate is charged to a Pyrex flask and heated with a boiling water bath for two hours 15 minutes, while stirring. At the end of this time, VPC analysis indicates that the epoxide is completely reacted and the product is 73 percent 2-hydroxy-p-menthane-1-acetate, 14.0 percent 1-hydroxy-p-menthane-2-acetate, and 13.0 percent by-products and isomers. On heating and stirring for 3 hours at 125°, the VPC analysis shows 75.0 percent 1-hydroxy-p-menthane-2-acetate, 15.0 percent 2-hydroxy-p-menthane-1-acetate, and 11.0 percent byproducts and isomers.

EXAMPLE 6

Isomerization of 8-p-menthene-2-hydroxy-1-formate 27 grams of 8-p-menthene-1,2-oxide (50 percent trans: 50 percent cis) is added dropwise to a mixture of 9.3 g. formic acid (97–100 percent) and 1.0 g. sodium formate in five min. while cooling with tap water, so that the temperature is kept under 38°. At this time, only 15 percent of the epoxides have reacted and the hydroxy formates are in an equal ratio of 1-hydroxy and 2-hydroxy forms. Stirring is continued at 40° ± 1° for 21 hours longer. The ratio of hydroxy formates is now 88 parts 1-hydroxy to 12 parts 2-hydroxy forms. VPC analysis showed a total of 88 percent hydroxy formates, 7 percent diformates, and 5 percent other impurities.

EXAMPLE 7

20 1/2 grams of 8 -p-menthene-1,2-oxide (84 percent cis: 15 percent trans) is added dropwise to a mixture of 7.0 g. formic acid (97–100 percent) and 1.0 g. sodium formate while keeping the reaction mixture below 34°, then stirred 16 hours longer at ambient temperature. VPC analysis now indicates that 60 parts 1-hydroxy to 40 parts 2-hydroxy compounds are present. After stirring 10 hours longer at 32–36°, the ratio is 68 parts 1-hydroxy to 32 parts 2-hydroxy compounds. When the temperature is raised and held at 85° ± 2° for approximately eight hours, a ratio of 88 parts 1-hydroxy to 12 parts 2-hydroxy compounds is obtained. Heating 4.3 hours longer at 100° ±2° increases the ratio to 94 parts 1-hydroxy to 6 parts 2-hydroxy compounds. The higher temperature 82 increases the formation of diformates but makes little difference in the other impurities. VPC analysis now showed 78 percent total hydroxy formates, 15 percent diformates, and 7 percent other impurities.

EXAMPLE 8

Isomerization of 8 -p-menthene-2-hydroxy- 1-propionate in Propionic Acid

A mixture of 164 g. limonene-1,2-oxide (50 percent trans, 50 percent cis) and 100 g. propionic acid is stirred and heated for 6.0 hours at 160° C. After the final heating, the mixture contains 78.9 percent 1-hydroxy compound, 3.3 percent 2-hydroxy compound, and 17.8 percent by-products and unidentified isomers. Lower temperatures result in lower conversion of the 2-hydroxy isomer to the 1-hydroxy isomer.

EXAMPLE 9

A mixture of 200 g. limonene-1,2-oxide (50 percent trans, 50 percent cis) 100 g. acetic acid, 5 g. anhydrous sodium acetate is stirred and heated at 110° ± 4° C. for 1.7 hours. The mixture is diluted with benzene and the acetic acid and sodium acetate are washed out with water until the washing remains neutral. On stripping off the benzene, a mixture containing 37 percent 2-hydroxy-8-p-menthene-1-acetate, 55 percent 1-hydroxy-8-p-menthene-2-acetate, and 8 percent by-products and unidentified isomers is produced. This mixture is heated slowly to 150° without isomerizing. On heating 4.0 hours at 157°–162° C. a mixture containing 62 percent of 1-hydroxy compound, 28 percent of 2-hydroxy compound and 10 percent by-products is produced. On heating 6.0 hours at 176°–180° , the analysis shows 75 percent of the 1hydroxy isomers, 15 percent of the 2-hydroxy isomers, and 10 percent by-products. At 200° ± 2° for 6.0 hours, the amount of by-products doubled, but the percent of 1-hydroxy isomer remains at about 75 percent. Thus, it is shown isomerization can be performed by heating in the absence of weak acids and their salts, but the rate of isomerization is slower.

EXAMPLE 10

A mixture of 33.4 g. limonene-1,2-oxides (92.5 percent cis, 7.5 percent trans), 21.2 g. acetic acid, and 2.0 g. anhydrous sodium acetate is stirred and heated to a temperature of 90–96°A C. for three hours. VPC analysis of the products shows 77 percent 2-hydroxy-8-p-menthene-1-acetate, 11.7 percent 1-hydroxy-8-p-menthene-2-acetate, and 11.3 percent total by-products. After distilling off part of the acetic acid, the mixture is held at 125°–130° C. for 6 hours. VPC analysis of this product showed 83.7 percent 1-hydroxy-8-p-menthene-2-acetate, 9.7 percent 2hydroxy-8-p-menthene-1-acetate, 2.1 percent diacetates, and 4.5 percent other by-products. This experiment shows that the sodium acetate in the acetic acid not only speeds up the reaction of the acid with the epoxide, but also the isomerization of the hydroxyacetate and reduces the formation of by-products.

What is claimed is:

1. A process for isomerizing an ester selected from the group consisting of 2-hydroxy-p-menthane-1-lower alkanoate and 2-hydroxy-8-p-menthene-1-lower alkanoate and mixtures thereof to the corresponding 1-hydroxy-p-menthane-2-lower alkanoate and 1-hydroxy-8-p-methane-2-lower alkanoate isomer which comprises heating said ester at a temperature of from about 30°–180° C.

2. The process of claim 1, wherein said heating is conducted in the presence of a lower fatty acid having from one to six carbon atoms or an alkali metal or ammonium salt thereof or mixtures of said acids and said salts.

3. The process of claim 2, wherein said temperature is between 80°–180° C. in said heating step.

4. The process of claim 3, wherein said heating is conducted for a period of from about 12–24 hours at a temperature between about 125°–150° C.

5. The process of claim 4, wherein said acid is present in a proportion of from about 2–75 percent by weight of the reactant and said salt is present in a proportion of not more than 20percent by weight of the acid.

6. The process of claim 4, wherein said lower fatty acid is acetic acid and said salt is a soluble acetate salt.

7. The process of claim 4, wherein said salt is an alkali metal acetate or ammonium acetate.

* * * * *